April 17, 1928. 1,666,799
J. D. TRAMMELL
REENFORCED CONCRETE PIPE
Filed April 25, 1927
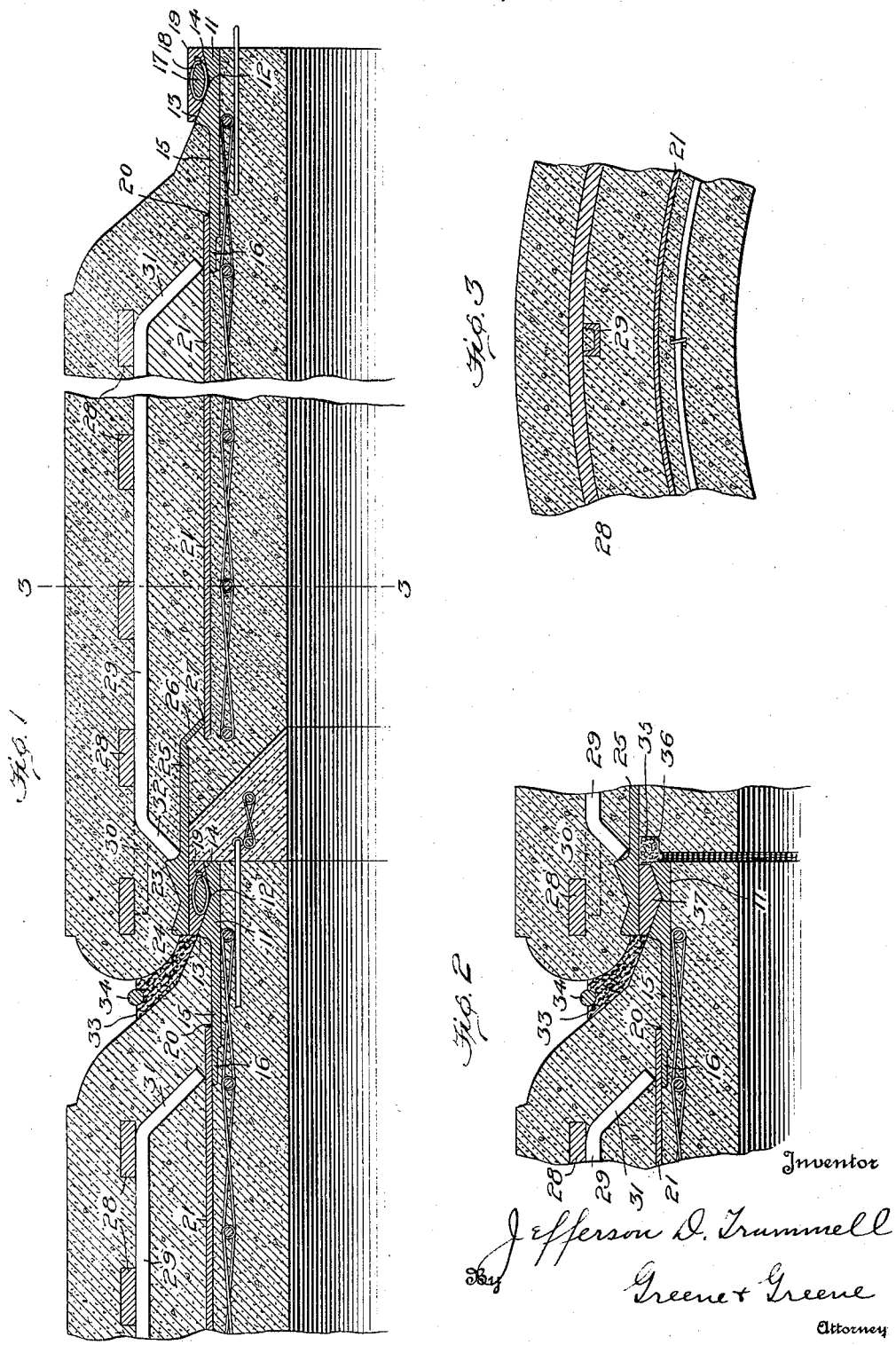

Patented Apr. 17, 1928.

1,666,799

UNITED STATES PATENT OFFICE.

JEFFERSON D. TRAMMELL, OF FORT WORTH, TEXAS.

REENFORCED CONCRETE PIPE.

Application filed April 25, 1927. Serial No. 186,319.

My invention relates to reenforced concrete pipes and the sealing of expansion joints for the sections thereof.

In such structures it is highly important to use a minimum number of special shapes of reenforcement without sacrificing desirable features. Because it is uneconomical to roll small quantities of unusual sections of metal, rolling mills often fix a minimum quantity, such as one hundred and fifty tons, for which they will undertake to set up special rolls.

My invention includes the use of coacting spigot and bell facings formed from a single special shape bent and welded into ring form, to provide an expansion joint which may be calked from either the interior or exterior of my pipes.

In the accompanying drawings, which are illustrative of my preferred form:

Figure 1 is an axial section of one of my pipes, including a joint, parts being broken away.

Fig. 2 is an axial section of an alternate form of joint.

Fig. 3 is a partial axial section on the line 3—3 of Fig. 1 showing certain details of the reenforcing members.

In these figures 11 represents a metal ring having an external circumferential groove 12 of progressively varying depth, the maximum diameter of the inner edge of which at 13 is greater than the corresponding diameter of the outer edge at 14 having a lateral extension 15 of uniform thickness and a marginal thinner section 16. Within the groove 12 is placed a reenforcing ring 17 preferably formed from a rolled steel bar of a standard oval shape, though round or other forms of reenforcements may be substituted. For spacing the ring 17 from the face of the groove 12 and to hold it approximately central the loops of wire 18 are attached at suitable intervals. By means of a suitable mold a ring 19 of lead or other ductile material may be cast to form a calking ring having embedded therein the reenforcing ring 17.

The lateral extension 15 is welded at 20 to a continuous metallic shell 21.

The metal ring for reenforcing the bell end of the pipe is made from the same rolled shape that is used for the spigot end but differs therefrom by having the inner marginal thinner section bent at 26 to make contact with the shell 21 to which it is welded at 27.

To supply properly positioned reenforcement a cage-like structure is formed of a plurality of rings 28 welded, or otherwise rigidly attached, to a plurality of spaced longitudinal members 29 and 30, for which I prefer to use small channel bars. One end 31 of each of the members 29 is bent inwardly to bear against the shell 21 while an opposite end 32 is bent to fit in the angle formed by a rib 23 and an extension 25 of my bell facing, thereby insuring the uniform spacing of the cage from the shell. Alternating with the longitudinal members 29 are the similar straight members 30 which carry an additional ring 28, but need not be terminally bent.

After these pipes have been completed by casting concrete about the reenforcement as shown my pipes are assembled by forcibly telescoping adjacent bell and spigot ends, leaving the calking ring 19 terminally exposed for tamping from within and without the pipe. In order to protect the exposed margins of my facing rings and the intermediate calking ring from electrolytic corrosion due to alkali or other salty ground water I prefer to pack against these margins in the peripheral groove a water-excluding elastic packing 33, preferably formed from braided jute combined with a bitumastic compound, and bind this packing 33 with a suitable ring 34 of wire or the like.

My Patent No. 1,607,415 discloses the internal reenforced concrete lining the internal filling ring and the external annular sealing ring exposing groove.

The modification disclosed in Fig. 2 is intended particularly for use in pipes which are too small to permit workmen to enter the pipe to calk the joints and cast the filling rings. In this form a packing ring 35 formed preferably from two braided hemp ropes is molded in or placed inside the bell in the concrete in which a suitable ring shaped recess 36 has been formed. As the pipes are assembled the hemp packing 35 is compressed and forms an abutment against which a suitable joint sealing ring 37 is cast of leadite, lead or any other suitable material. In this modification the protecting ring 33 is placed before the leadite sealing ring is cast, a suitable opening being temporarily left to permit the pouring of the sealing material.

Because my pipes are sometimes subjected to severe strains during the laying operation which tend to crank and cause the outer concrete shell to separate from the shell 21, my form of bell and spigot facing furnishes rigid abutments for this shell at 13, 26, 23 and 24 and while this reenforcement will generally prevent the cracking of the concrete, even in such cases as breakage may occur, the parts are held against separation and the pipes may be mended by filling such cracks with cement grout.

The rib 13 is made larger than its companion 12 for the purpose of withstanding the shearing strains in the calking ring as the pipe sections are forced together.

The reenforcing ring 17 serves also to hold the calking ring mold properly centered, tends to prevent the malicious removal and theft of the lead used, and, because steel is cheaper than the lead displaced, it tends to reduce the cost of manufacture.

My pipes are generally cast with their axes vertical, in which position it is evident that the provision made for holding my reenforcing cage properly centered is highly important. While still in this position I cast the calking ring, which can be more certainly and perfectly done in this position because the hot lead has a relatively short distance to travel from the top to the bottom of the mold, whereas joints formed after the pipes are telescoped require the molten lead or other sealing fluid to travel relatively long distances through a narrow channel two sides of which are formed by the heat conducting bell and spigot linings. Obviously it is difficult to completely fill such long narrow channels with molten lead—the sudden chilling of which may close these channels before the lead has completely filled the bottom portions. My pre-cast sealing rings also permit me to dispense with the centering lugs shown in my above-mentioned patent.

Various obvious modifications may be made within the scope of my invention, such as forming my bell lining with an internal groove and casting therein my calking ring.

What I claim is:

1. A rolled steel ring for pipe joints having one cylindrical smooth face and on an opposite face two annular projecting ribs forming a marginal re-entrant groove, and a marginal thinner section.

2. A reenforced concrete pipe having a metallic joint facing formed with an external groove of progressively varying depth, an externally smooth calking ring of ductile metal fitting in said external groove, and a circumferential, approximately central reenforcing ring embedded in said ductile metal.

3. In a reenforced concrete pipe, a continuous metallic shell united at one end to a spigot facing ring having a cylindrical inner face and an external circumferential groove of progressively varying depth and united at an opposite end to an externally smooth bell facing ring similar to said spigot facing, the inner margin of one of said rings being bent towards said shell to compensate for the difference in diameter of said facings and to permit uniting to said shell.

4. In a telescoping pipe joint, the combination with bell and spigot facings having on the outer surface of each a marginal circumferential V-shaped groove, and a pre-cast reenforced calking ring on said spigot facing.

5. A rolled steel pipe joint ring having a thin flat flange and adjacent to one edge a thickened portion having a V-shaped groove therein.

6. A rolled steel pipe joint ring having one smooth face and on the face opposite said smooth face having a marginal elevation provided with a V-shaped packing receiving groove of substantially the depth of the said elevation.

7. In reenforced concrete pipe reinforcement, the combination with a continuous metallic shell having an outwardly extending rib, and an outer cage-like reenforcement formed from a plurality of spaced circumferential rings welded to a plurality of spaced longitudinal bars, said bars being terminally bent at one end to abut against said rib the said bars being also bent at opposite ends to rest against said shell.

In testimony whereof I hereunto affix my signature.

JEFFERSON D. TRAMMELL.